United States Patent
Hamamoto et al.

(10) Patent No.: US 6,933,356 B2
(45) Date of Patent: Aug. 23, 2005

(54) PARTICLES OF CARBOXYLATED POLYMER

(75) Inventors: Shigeki Hamamoto, Himeji (JP); Tomoki Kawakita, Himeji (JP); Masatoyo Yoshinaka, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 56 days.

(21) Appl. No.: 10/473,976

(22) PCT Filed: Mar. 22, 2002

(86) PCT No.: PCT/JP02/02745

§ 371 (c)(1),
(2), (4) Date: Oct. 3, 2003

(87) PCT Pub. No.: WO02/081533

PCT Pub. Date: Oct. 12, 2002

(65) Prior Publication Data

US 2004/0106757 A1 Jun. 3, 2004

(30) Foreign Application Priority Data

Apr. 5, 2001 (JP) ......................................... 2001-106944

(51) Int. Cl.⁷ ............................................. G09F 130/06
(52) U.S. Cl. ................ 526/238.23; 528/193; 528/317.1; 528/318.3; 528/318.6
(58) Field of Search ................ 526/238.23, 193, 526/317.1, 318.3, 318.6, 909

(56) References Cited

U.S. PATENT DOCUMENTS

| | | | |
|---|---|---|---|
| 2,923,692 A | 2/1960 | Ackerman et al. | |
| 2,958,679 A | 11/1960 | Jones | |
| 3,426,004 A | 2/1969 | Wagner | |
| 5,013,787 A | * 5/1991 | Barron et al. | 524/555 |
| 5,629,395 A | * 5/1997 | Fujikake et al. | 526/238.23 |
| 6,599,979 B2 | * 7/2003 | Fujikake et al. | 525/183 |

FOREIGN PATENT DOCUMENTS

| | | |
|---|---|---|
| EP | 0 349 240 A2 | 1/1990 |
| EP | 0 590 988 A2 | 4/1994 |
| EP | 0 870 785 A1 | 10/1998 |
| EP | 590988 A2 | 4/2004 |
| JP | 58-84819 A | 5/1983 |
| JP | 8-157531 A | 6/1996 |
| JP | 8-157606 A | 6/1996 |
| JP | 9-157130 A | 6/1997 |
| WO | WO 00/77093 A1 | 12/2000 |

* cited by examiner

*Primary Examiner*—Tatyana Zalukaeva
(74) *Attorney, Agent, or Firm*—Birch, Stewart, Kolasch & Birch, LLP

(57) ABSTRACT

Carboxyl group-containing polymer particles giving a neutralized viscous liquid being excellent in gel appearance and transparency. Carboxyl group-containing polymer particles comprising 55 to 94% by volume of water-swelled gel particles having a particle diameter of less than 50 μm when the carboxyl group-containing polymer particles are dispersed and swelled in water in a concentration of 0.5% by weight, and 6 to 45% by volume of water-swelled gel particles having a particle diameter of at least 50 μm when carboxyl group-containing polymer gel particles are dispersed and swelled in water in a concentration of 0.5% by weight.

5 Claims, No Drawings

PARTICLES OF CARBOXYLATED POLYMER

This application is the national phase under 35 U.S.C. §371 of PCT International Application No. PCT/JP02/02745 which has an International filing date of Mar. 22, 2002, which designated the United States of America.

TECHNICAL FIELD

The present invention relates to carboxyl group-containing polymer particles. More specifically, the present invention relates to carboxyl group-containing polymer particles which can be suitably used as a thickener for cosmetics and the like, a suspension stabilizer for emulsions or suspensions, and the like; and a process for preparing the same.

BACKGROUND ART

As a carboxyl group-containing polymer, there have been known a copolymer of an $\alpha,\beta$-unsaturated carboxylic acid such as acrylic acid and a polyallyl ether (U.S. Pat. No. 2,923,692); a copolymer of an $\alpha,\beta$-unsaturated carboxylic acid and hexaallyl trimethylene trisulfone (U.S. Pat. No. 2,958,679); a copolymer of an $\alpha,\beta$-unsaturated carboxylic acid and triallyl phosphate (U.S. Pat. No. 3,426,004); a copolymer of an $\alpha,\beta$-unsaturated carboxylic acid and glycidyl methacrylate (Japanese Patent Laid-Open No. Sho 58-84819); and the like. The particles of these carboxyl group-containing polymers have been used for uses such as a thickener for cosmetics and a suspension stabilizer for emulsions or suspensions, after the particles are dispersed and swelled in water, and neutralized with an alkali, to give a neutralized viscous liquid.

However, there are some defects in the neutralized viscous liquids prepared by neutralizing the above-mentioned particles of the carboxyl group-containing polymers with an alkali that gloss or the like is insufficient because the gel appearance (surface smoothness) and transparency of the liquids are insufficient. Therefore, if the gel appearance of a neutralized viscous liquid is excellent, there are some defects that it takes a long period of time for agitation, and in some cases, at least 10 hours for mixing with agitation, which differs depending upon the agitation apparatus or the agitation conditions used for the neutralization when the particles are neutralized with an alkali, so that its productivity is not good.

DISCLOSURE OF INVENTION

The present invention has been accomplished in view of the above-mentioned prior art. An object of the present invention is to provide carboxyl group-containing polymer particles which give a neutralized viscous liquid being excellent in gel appearance and transparency.

The present invention relates to:

(1) carboxyl group-containing polymer particles comprising 55 to 94% by volume of water-swelled gel particles having a particle diameter of less than 50 μm when the carboxyl group-containing polymer particles are dispersed and swelled in water in a concentration of 0.5% by weight, and 6 to 45% by volume of water-swelled gel particles having a particle diameter of at least 50 μm when the carboxyl group-containing polymer particles are dispersed and swelled in water in a concentration of 0.5% by weight; and (2) a process for preparing the carboxyl group-containing polymer particles as defined in the above (1), comprising reacting 6 to 25 parts by volume of an $\alpha,\beta$-unsaturated carboxylic acid based on 100 parts by volume of an inert solvent, with 0.15 to 2 parts by weight of a compound having at least two ethylenic unsaturated groups based on 100 parts by weight of the $\alpha,\beta$-unsaturated carboxylic acid at 50° to 90° C. in the inert solvent in the presence of 0.01 to 0.45 parts by weight of a radical polymerization catalyst based on 100 parts by weight of the $\alpha,\beta$-unsaturated carboxylic acid.

BEST MODE FOR CARRYING OUT THE INVENTION

As described above, the carboxyl group-containing polymer particles of the present invention comprise 55 to 94% by volume of water-swelled gel particles having a particle diameter of less than 50 μm when the carboxyl group-containing polymer particles are dispersed and swelled in water in a concentration of 0.5% by weight, and 6 to 45% by volume of water-swelled gel particles having a particle diameter of at least 50 μm when the carboxyl group-containing polymer particles are dispersed and swelled in water in a concentration of 0.5% by weight.

As described above, when the carboxyl group-containing polymer particles of the present invention are dispersed in water in a given concentration and swelled, the water-swelled gel particles of the carboxyl group-containing polymer have a specified particle size distribution, so that there are exhibited some excellent effects such that the gel appearance of the resulting neutralized viscous liquid becomes excellent, and that there is obtained a neutralized viscous liquid having excellent transparency.

In the present invention, the reason why the carboxyl group-containing polymer particles are dispersed in water so as to have a concentration of 0.5% by weight and swelled is that the polymer particles are generally used in a concentration of at most 0.5% by weight in many cases and the gel appearance of a 0.5% by weight neutralized viscous liquid is remarked when used as cosmetics and the like.

In the present specification, the phrase "when the carboxyl group-containing polymer particles are dispersed in water and swelled" means that the carboxyl group-containing polymer particles are dispersed in water and swelled, and the swelled particles are attained to equilibrated state. When the polymer particles are dispersed in water and swelled, the temperature of the water is not limited to specified ones. The temperature of the water is usually 20° to 30° C. or so.

The particle diameter of the water-swelled gel particles dispersed in a concentration of 0.5% by weight is intended to mean a particle diameter determined by a laser diffraction type particle size distribution analyzer (commercially available from Shimadzu Corporation under the trade name of SALD-2000 J) after charging a 200-mL beaker with 149.25 g of ion-exchanged water at 25° C., gradually adding thereto 0.75 g of carboxyl group-containing polymer particles, while stirring with a stirrer (length: 28 mm and thickness: 7 mm) at 600 rotations per minute, thereafter stirring the dispersion for 1.5 hours.

The content of the water-swelled gel particles having each particle diameter is obtained by determining the particle diameters and at the same time, counting the number of gel particles having the particle diameter with the above-mentioned laser diffraction type particle size distribution analyzer, and multiplying the volume of one gel particle as regarded as spherical by the number of the particles.

The reason why the particle diameter of the water-swelled gel particles is controlled to less than 50 μm, after the carboxyl group-containing polymer particles are dispersed in a concentration of 0.5% by weight, is that the gel appearance of the neutralized viscous liquid of the carboxyl group-containing polymer particles is grainy if the particles having a particle diameter of at least 50 μm are contained in a large amount. The particle diameter of the above-mentioned water-swelled gel particles is preferably at least 0.1 μm and less than 50 μm from the viewpoint of improving the gel appearance of the neutralized viscous liquid of the carboxyl group-containing polymer particles.

The amount of the water-swelled gel particles having a particle diameter of less than 50 μm when the carboxyl group-containing polymer particles are dispersed in water in a concentration of 0.5% by weight is at least 55% by volume, preferably at least 58% by volume, more preferably at least 60% by volume, from the viewpoint of improving the gel appearance of the neutralized viscous liquid of the carboxyl group-containing polymer particles. Also, the amount of the water-swelled gel particles having a particle diameter of less than 50 μm when the carboxyl group-containing polymer particles are dispersed in water in a concentration of 0.5% by weight is at most 94% by volume, preferably at most 92% by volume, more preferably at most 90% by volume, from the viewpoint of increasing the transparency of the neutralized viscous liquid of the carboxyl group-containing polymer particles.

The reason why the particle diameter of the water-swelled gel particles is controlled to at least 50 μm when the particles are dispersed in water in a concentration of 0.5% by weight is that the transparency of the neutralized viscous liquid of the carboxyl group-containing polymer particles is deteriorated if the particles having a particle diameter of less than 50 μm are contained in a large amount. The particle diameter of the above-mentioned water-swelled gel particles is preferably at least 50 μm and at most 300 μm from the viewpoint of increasing the transparency of the neutralized viscous liquid of the carboxyl group-containing polymer particles.

The amount of the water-swelled gel particles having a particle diameter of at least 50 μm, when the particles are dispersed in water in a concentration of 0.5% by weight, is at most 45% by volume, preferably at most 42% by volume, more preferably at most 40% by volume, from the viewpoint of improving the gel appearance of the neutralized viscous liquid of the carboxyl group-containing polymer particles. Also, the amount of the water-swelled gel particles having a particle diameter of less than 50 μm is at least 6% by volume, preferably at least 8% by volume, more preferably at least 10% by volume, from the viewpoint of increasing transparency of the neutralized viscous liquid of the carboxyl group-containing polymer particles.

In consideration of the above viewpoints, when the carboxyl group-containing polymer particles of the present invention are dispersed so as to have a concentration of 0.5% by weight, it is desired that the content of the water-swelled gel particles having a particle diameter of less than 50 μm, preferably at least 0.1 μm and less than 50 μm is 55 to 94% by volume, preferably 58 to 92% by volume, more preferably 60 to 90% by volume. Also, it is desired that the content of the water-swelled gel particles having a particle diameter of at least 50 μm, preferably at least 50 μm and at most 300 μm is 6 to 45% by volume, preferably 8 to 42% by volume, more preferably 10 to 40% by volume.

The carboxyl group-containing polymer particles which give water-swelled gel particles having a specified particle size distribution mentioned above when the polymer particles are dispersed in water in the above-mentioned given concentration and swelled, can be obtained by reacting an α,β-unsaturated carboxylic acid in a specified amount with a compound having at least two ethylenic unsaturated groups in a specified amount at a specified temperature in the presence of a specified amount of a radical polymerization catalyst in an inert solvent.

The α,β-unsaturated carboxylic acid is not limited to specified ones, and includes, for instance, acrylic acid, methacrylic acid, crotonic acid, maleic acid, itaconic acid, fumaric acid, other olefinic unsaturated carboxylic acids, and the like. These carboxylic acids can be used alone or in admixture of at least two kinds. Among them, acrylic acid is preferable because it is inexpensive and readily available and gives excellent transparency to the neutralized viscous liquid of the carboxyl group-containing polymer particles.

The amount of the α,β-unsaturated carboxylic acid is 6 to 25 parts by volume, preferably 8 to 22 parts by volume, more preferably 13 to 20 parts by volume, based on 100 parts by volume of the inert solvent described below. When the amount of the α,β-unsaturated carboxylic acid is smaller than the above-mentioned lower limit, the transparency of the resulting neutralized viscous liquid of the carboxyl group-containing polymer particles is lowered. Also, when the amount exceeds the above-mentioned upper limit, the polymer particles are precipitated as the reaction proceeds, thereby making it difficult to homogeneously agitate the mixture, so that the gel appearance of the resulting neutralized viscous liquid of the carboxyl group-containing polymer particles is grainy.

The compound having at least two ethylenic unsaturated groups is not limited to specified ones, and includes, for instance, acrylates of polyols having at least two substituted groups such as ethylene glycol, diethylene glycol, propylene glycol, polyoxyethylene glycol, polyoxypropylene glycol, glycerol, polyglycerol, trimethylolpropane, pentaerythritol, saccharose and sorbitol; methacrylates of polyols having at least two substituted groups; allyl ethers of polyols having at least two substituted groups; diallyl phthalate, triallyl phosphate, allyl methacrylate, tetraallyloxyethane, triallyl cyanurate, divinyl adipate, vinyl crotonate, 1,5-hexadiene, divinylbenzene, and the like. Among them, at least one member selected from the group consisting of pentaerythritol tetraallyl ether, diethylene glycol diallyl ether and polyallyl saccharose is preferable from the viewpoint of increasing the transparency of the resulting neutralized viscous liquid of the carboxyl group-containing polymer particles.

The amount of the compound having at least two ethylenic unsaturated groups is 0.15 to 2 parts by weight, preferably 0.3 to 1.5 parts by weight, based on 100 parts by weight of the α,β-unsaturated carboxylic acid. When the amount of the compound having at least two ethylenic unsaturated groups is smaller than the above-mentioned lower limit, the viscosity of the neutralized viscous liquid of the resulting carboxyl group-containing polymer particles is lowered, and when the amount exceeds the above-mentioned upper limit, an insoluble gel is likely to be produced in the resulting neutralized viscous liquid of the carboxyl group-containing polymer particles .

The above-mentioned radical polymerization catalyst is not limited to specified ones, and includes, for instance, azobisisobutyronitrile, 2,2'-azobis-2,4-dimethylvaleronitrile, dimethyl-2,2'-azobisisobutyrate, benzoyl peroxide, lauroyl peroxide, cumene hydroperoxide, tertiary butyl hydroperoxide, and the like. Among them, azobisisobutyronitrile is favorably used from the viewpoint of being easy to handle and excellent in stability.

The amount of the radical polymerization catalyst is 0.01 to 0.45 parts by weight, preferably 0.01 to 0.35 parts by weight, based on 100 parts by weight of the α,β-unsaturated carboxylic acid. When the amount of the radical polymerization catalyst is smaller than the above-mentioned lower limit, it is not economical because the reaction rate is lowered, and when the amount exceeds the above-mentioned upper limit, the gel appearance of the resulting neutralized viscous liquid of the carboxyl group-containing polymer particles is grainy.

The inert solvent, as used herein, refers to a solvent which dissolves the α,β-unsaturated carboxylic acid and the compound having at least two ethylenic unsaturated groups but does not dissolve the carboxyl group-containing polymer particles obtained.

The inert solvent includes, for instance, normal pentane, normal hexane, isohexane, normal heptane, normal octane, isooctane, cyclopentane, methylcyclopentane, cyclohexane, methylcyclohexane, benzene, toluene, xylene, chlorobenzene, ethylene dichloride, ethyl acetate, isopropyl acetate, methyl ethyl ketone, methyl isobutyl ketone, and the like. These solvents can used alone or in admixture of at least two kinds. Among them, ethylene dichloride is preferable from the viewpoint of being stable in quality and readily available.

It is preferable that the reaction of the α,β-unsaturated carboxylic acid with the compound having at least two ethylenic unsaturated groups is carried out in the presence of an alkali metal carbonate together with the radical polymerization catalyst. When the reaction is carried out in the presence of the alkali metal carbonate together with the radical polymerization catalyst as mentioned above, the gel appearance of the resulting neutralized viscous liquid of the carboxyl group-containing polymer particles can be further improved.

The alkali metal carbonate includes sodium carbonate, potassium carbonate, sodium hydrogencarbonate, potassium hydrogencarbonate, and the like. Among them, sodium carbonate and potassium hydrogencarbonate are preferable because the lowering in the viscosity of the resulting neutralized viscous liquid of the carboxyl group-containing polymer particles is small.

It is desired that the amount of the alkali metal carbonate is 0.01 to 5 parts by weight, preferably 0.05 to 3 parts by weight, based on 100 parts by weight of the α,β-unsaturated carboxylic acid from the viewpoint of improving the gel appearance of the neutralized viscous liquid.

The alkali metal carbonate can be added before the beginning of the reaction or during the course of the reaction. However, from the viewpoint of still more effectively improving the gel appearance of the neutralized viscous liquid of the carboxyl group-containing polymer particles, it is preferable that the alkali metal carbonate is added before the beginning of reaction.

It is preferable that the atmosphere where the α,β-unsaturated carboxylic acid is reacted with the compound having at least two ethylenic unsaturated groups is, for instance, an inert gas such as nitrogen gas or argon gas.

It is desired that the reaction temperature is 50° to 90° C., preferably 55° to 75° C., from the viewpoint of lowering the viscosity of the reaction solution so that the solution can be agitated homogeneously, and from the viewpoint of improving the gel appearance of the resulting neutralized viscous liquid of the carboxyl group-containing polymer particles.

The reaction time cannot be absolutely determined because the reaction time differs depending upon the reaction temperature. The reaction time is usually 2 to 10 hours.

After the termination of the reaction, white fine powder of carboxyl group-containing polymer particles can be obtained by heating the reaction solution to 80° to 130° C. to remove the inert solvent by evaporation. In the case where the heating temperature exceeds 130° C., there is a possibility that the gel appearance of the resulting neutralized viscous liquid of the carboxyl group-containing polymer particles is grainy.

The carboxyl group-containing polymer particles of the present invention are thus obtained. The powder of the carboxyl group-containing polymer particles obtained is usually composed of secondary particles in which primary particles are aggregated.

When a neutralized viscous liquid is prepared using the carboxyl group-containing polymer particles obtained, the polymer particles are dispersed in water so that the concentration of the carboxyl group-containing polymer particles is usually 0.01 to 3% by weight, and thereafter the dispersion is neutralized with an alkali such as an alkali metal hydroxide such as sodium hydroxide, or an amine such as triethanolamine or diisopropanolamine.

The neutralized viscous liquid obtained has excellent properties such as gel appearance and high transparency. The reason why this neutralized viscous liquid has excellent properties as described above cannot be absolutely determined. The reason will be presumably based on the fact that the secondary particles of the carboxyl group-containing polymer particles are dispersed in water when the carboxyl group-containing polymer particles are dispersed in water and swelled, and the carboxyl group-containing polymer particles will exist in water as the primary particles of the water-swelled gel particles.

Next, the present invention will be explained more specifically on the bases of examples, without intending to limit the present invention only to those examples.

EXAMPLE 1

A 500 mL four-neck flask equipped with a stirrer, a thermometer, a nitrogen gas inlet tube and a condenser was charged with 63 g (60 mL) of acrylic acid, 0.44 g of pentaerythritol tetraallyl ether, 0.016 g of azobisisobutyronitrile and 375 g (300 mL) of ethylene dichloride. Subsequently, the mixture was homogeneously mixed with stirring, and thereafter nitrogen gas was blown into the solution in order to remove oxygen existing in the upper space of the flask and the starting materials and the solvent. Next, the temperature of the mixture was kept at 70° to 75° C. under nitrogen atmosphere and reacted for 3 hours.

After the termination of the reaction, the resulting slurry was heated to 110° C. to distill off ethylene dichloride. As a result, 63 g of carboxyl group-containing polymer particles were obtained.

An aqueous dispersion containing 0.5% by weight of the carboxyl group-containing polymer particles was prepared, and the particle size distribution was determined with a laser diffraction-type particle size distribution analyzer (manufactured by Shimadzu Corporation under the product number of SALD-2000J). As a result, the water-swelled gel particles were composed of 0% by volume of particles having a particle diameter of less than 0.1 µm, 72% by volume of particles having a particle diameter of at least 0.1 µm and less than 50 µm, 27.6% by volume of particles having a particle diameter of at least 50 µm and at most 300 µm, and 0.4% by volume of particles having a particle diameter exceeding 300 µm.

EXAMPLE 2

The same procedures as in Example 1 were carried out except that the components charged to the four-neck flask were changed to 57.3 g (54.6 mL) of acrylic acid, 0.66 g of pentaerythritol tetraallyl ether, 0.1 g of azobisisobutyronitrile and 525 g (420 mL) of ethylene dichloride, and that the reaction temperature was changed to 55° to 60° C., to give 58 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 81% by volume of particles having a particle diameter of at least 0.1 μm and less than 50 μm, 18.8% by volume of particles having a particle diameter of at least 50 μm and at most 300 μm, and 0.2% by volume of particles having a particle diameter exceeding 300 μm.

EXAMPLE 3

The same procedures as in Example 1 were carried out except that 0.75 g of diethylene glycol diallyl ether was used in place of 0.44 g of pentaerythritol tetraallyl ether in Example 1, to give 63 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 73% by volume of particles having a particle diameter of at least 0.1 μm and less than 50 μm, 26.9% by volume of particles having a particle diameter of at least 50 μm and at most 300 μm, and 0.1% by volume of particles having a particle diameter of exceeding 300 μm.

EXAMPLE 4

The same procedures as in Example 1 were carried out except that 0.42 g of polyallyl saccharose was used in place of 0.44 g of pentaerythritol tetraallyl ether in Example 1, to give 63 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 72% by volume of particles having a particle diameter of at least 0.1 μm and less than 50 μm, 27.6% by volume of particles having a particle diameter of at least 50 μm and at most 300 μm, and 0.4% by volume of particles having a particle diameter exceeding 300 μm.

EXAMPLE 5

The same procedures as in Example 1 were carried out except that 0.5 g of sodium carbonate was charged together with the same components as used in Example 1, to give 64 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 74% by volume of particles having a particle diameter of at least 0.1 μm and less than 50 μm, 26% by volume of particles having a particle diameter at least 50 μm and at most 300 μm, and 0% by volume of particles having a particle diameter exceeding 300 μm.

EXAMPLE 6

The same procedures as in Example 1 were carried out except that 0.9 g of sodium carbonate was charged together with the same components as used in Example 1, to give 65 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 75% by volume of particles having a particle diameter of at least 0.1 μm and less than 50 μm, 25% by volume of particles having a particle diameter of at least 50 μm and at most 300 μm, and 0% by volume of particles having a particle diameter exceeding 300 μm.

EXAMPLE 7

The same procedures as in Example 1 were carried out except that 1.8 g of sodium carbonate was charged together with the same components as used in Example 1, to give 64 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 77% by volume of particles having a particle diameter of at least 0.1 μm and less than 50 μm, 23% by volume of particles having a particle diameter of at least 50 μm and at most 300 μm, and 0% by volume of particles having a particle diameter exceeding 300 μm.

Comparative Example 1

The same procedures as in Example 1 were carried out except that the components charged to the four-neck flask in Example 1 was changed to 30 g (28.6 mL) of acrylic acid, 0.47 g of pentaerythritol tetraallyl ether, 0.15 g of azobisisobutyronitrile and 411 g (328.8 mL) of ethylene dichloride, and that the reaction temperature was changed to 45° to 50° C., to give 30 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0.2% by volume of particles having a particle diameter of less than 0.1 μm, 95% by volume of particles having a particle diameter of at least 0.1 μm and less than 50 μm, 4.8% by volume of particles having a particle diameter of at least 50 μm and at most 300 μm, and 0% by volume of particles having a particle diameter exceeding 300 μm.

Comparative Example 2

The same procedures as in Example 1 were carried out except that the components charged to the four-neck flask in Example 1 were changed to 110.25 g (105 mL) of acrylic acid, 0.42 g of pentaerythritol tetraallyl ether, 0.007 g of azobisisobutyronitrile and 437.5 g (350 mL) of ethylene dichloride, to give 111 g of carboxyl group-containing polymer particles.

An aqueous dispersion containing 0.5% by weight of the carboxyl group-containing polymer particles was prepared, and the particle size distribution was determined in the same manner as in Example 1. As a result, the water-swelled gel particles were composed of 0% by volume of particles having a particle diameter of less than 0.1 μm, 28% by volume of particles having a particle diameter of at least 0.1 μm and less than 50 μm, 69.2% by volume of particles having a particle diameter of at least 50 μm and at most 300 μm, and 2.8% by volume of particles having a particle diameter exceeding 300 μm.

[Evaluation of Physical Properties of Carboxyl Group-containing Polymer Particles]

Physical properties of the carboxyl group-containing polymer particles obtained in Examples and Comparative Examples were evaluated on the bases of the following methods. The results are shown in Table 1.

(1) Gel Appearance

A 1-L beaker was charged with 483.3 g of ion-exchanged water, and 2.5 g of the carboxyl group-containing polymer particles were gradually added thereto, while stirring with a stirrer (length: 5 cm and thickness: 1.5 cm) at 600 rotations per minute. The mixture was stirred for additional 1.5 hours, the stirrer was taken out from the flask, and 14.2 g of a 6% by weight aqueous sodium hydroxide was added thereto. The mixture was stirred with an agitation blade as prescribed in CTFA (The Cosmetic Toiletry and Fragrance Association) for one hour, to give a neutralized viscous liquid of carboxyl group-containing polymer particles.

The gel appearance of the neutralized viscous liquid of the carboxyl group-containing polymer particles was visually evaluated. The evaluation was made by a total of 10 male and female individuals as evaluation panelists, and the number of individuals of the panelists who had an excellent feel for the evaluation on the gel appearance of the neutralized viscous liquid was totaled, and judged on the bases of the following evaluation criteria. In the ordinary case, if the judgment is at least A in the following evaluation criteria, it can be evaluated to have an excellent gel appearance.

| | [Evaluation Criteria] |
|---|---|
| S: | The number of individuals who had a feel that the gel appearance of the neutralized viscous liquid is excellent is 10; |
| A: | The number of individuals who had a feel that the gel appearance of the neutralized viscous liquid is excellent is 8 or 9; |
| B: | The number of individuals who had a feel that the gel appearance of the neutralized viscous liquid is excellent is at most 7; |

(2) Transparency

A cell of 1 cm×1 cm was charged with the neutralized viscous liquid of carboxyl group-containing polymer particles obtained in the above-mentioned (1), and transmittance was determined at a wavelength of 425 nm. In the ordinary case, if the transmittance is at least 92%, it can be evaluated to have excellent transparency.

(3) Viscosity

The viscosity of the neutralized viscous liquid of carboxyl group-containing polymer particles obtained in the above-mentioned (1) was determined by a B-type rotary viscometer under the conditions of Rotor No. 7, 20 rotations per minute and a temperature of 25° C. In the ordinary case, if the viscosity is 40000 mPa·s or more at 25° C., it can be evaluated to have a high viscosity.

TABLE 1

| | Gel Appearance | Transparency [Transmittance (%)] | Viscosity (mPa · s) |
|---|---|---|---|
| Example No. | | | |
| 1 | A | 97 | 49000 |
| 2 | S | 96 | 49000 |
| 3 | A | 98 | 51000 |
| 4 | A | 98 | 45000 |
| 5 | S | 97 | 46000 |
| 6 | S | 97 | 42000 |
| 7 | S | 97 | 40000 |
| Comp. Ex. | | | |
| 1 | S | 80 | 42000 |
| 2 | B | 99 | 52000 |

It can be seen from the results shown in Table 1 that the neutralized viscous liquids of the carboxyl group-containing polymer particles obtained in Examples 1 to 7 are excellent in gel appearance and transparency and have high viscosity, thereby making it useful as a thickener.

INDUSTRIAL APPLICABILITY

The carboxyl group-containing polymer particles of the present invention have a specified particle size distribution when the carboxyl group-containing polymer particles are dispersed in water to give water-swelled gel particles. Therefore, the neutralized viscous liquid obtained is excellent in gel appearance and transparency. Also, since the neutralized viscous liquid has a high viscosity, the neutralized viscous liquid is useful as a thickener for cosmetics and the like.

What is claimed is:

1. A process for preparing carboxyl group-containing polymer particles, comprising reacting 6 to 25 parts by volume of an α,β-unsaturated carboxylic acid based on 100 parts by volume of an inert solvent, with 0.15 to 2 parts by weight of a compound having at least two ethylenic unsaturated groups based on 100 parts by weight of the α,β-unsaturated carboxylic acid at 50° to 90° C. in the inert solvent in the presence of 0.01 to 0.45 parts by weight of a radical polymerization catalyst and 0.01 to 5 parts by weight of an alkali metal carbonate based on 100 parts by weight of the α,β-unsaturated carboxylic acid.

2. The process for preparing carboxyl group-containing polymer particles according to claim 1, wherein the alkali metal carbonate is sodium carbonate or potassium hydrogencarbonate.

3. The process for preparing a carboxyl group-containing polymer particle according to claim 1, wherein the α,β-unsaturated carboxylic acid is acrylic acid.

4. The process for preparing carboxyl group-containing polymer particles according to claim 1, wherein the compound having at least two ethylenic unsaturated groups is at least one member selected from the group consisting of pentaerythritol tetraallyl ether, diethylene glycol diallyl ether and polyallyl saccharose.

5. The process for preparing carboxyl group-containing polymer particles according to claim 1, wherein the carboxyl group-containing polymer particles comprising 55 to 94% by volume of water-swelled gel particles having a particle diameter of less than 50 μm when the carboxyl group-containing polymer particles are dispersed and swelled in water in a concentration of 0.5% by weight, and 6 to 45% by volume of water-swelled gel particles having a particle diameter of at least 50 μm when the carboxyl group-containing polymer particles are dispersed and swelled in water in a concentration of 0.5% by weight.

* * * * *